United States Patent [19]
Brunger

[11] 3,852,585
[45] Dec. 3, 1974

[54] MOTOR VEHICLE LAMP UNIT
[75] Inventor: Ronald N. Brunger, Fort Wayne, Ind.
[73] Assignee: International Harvester Company, Chicago, Ill.
[22] Filed: Mar. 15, 1973
[21] Appl. No.: 341,657

[52] U.S. Cl.............. 240/57, 240/7.1 R, 240/151
[51] Int. Cl............................................. B60q 3/02
[58] Field of Search...... 240/7.1 R, 8.2, 8.22, 41.55, 240/57, 151, 152

[56] References Cited
UNITED STATES PATENTS

| | | | |
|---|---|---|---|
| 915,268 | 3/1909 | Caywood | 240/152 |
| 2,428,167 | 9/1947 | Linton | 240/151 X |
| 2,959,668 | 11/1960 | Andrews | 240/152 |
| 3,228,288 | 1/1966 | Marien | 240/152 X |
| 3,396,269 | 8/1968 | Sorenson | 240/152 |
| 3,514,010 | 5/1970 | Rossi | 240/41.55 X |
| 3,692,998 | 9/1972 | Adams at al. | 240/8.2 |

FOREIGN PATENTS OR APPLICATIONS

| | | | |
|---|---|---|---|
| 2,001,708 | 10/1970 | Germany | 240/152 |

Primary Examiner—Fred L. Braun
Attorney, Agent, or Firm—Frederick Krubel; Floyd B. Harman

[57] ABSTRACT

A motor vehicle lamp unit construction wherein the translucent lens part of the lamp unit is made of plastic material or the like and is integrally formed with a lamp housing portion which is coated with an opaque material. A plurality of lugs, integrally formed with the lamp housing, are cooperable with the edge of an opening in the supporting wall in which the lamp unit is to be mounted so as to firmly secure the lamp unit to the supporting surface without the need of separate or individual fastening devices and which securance of the lamp unit is accomplished without employing tools of any sort.

9 Claims, 7 Drawing Figures

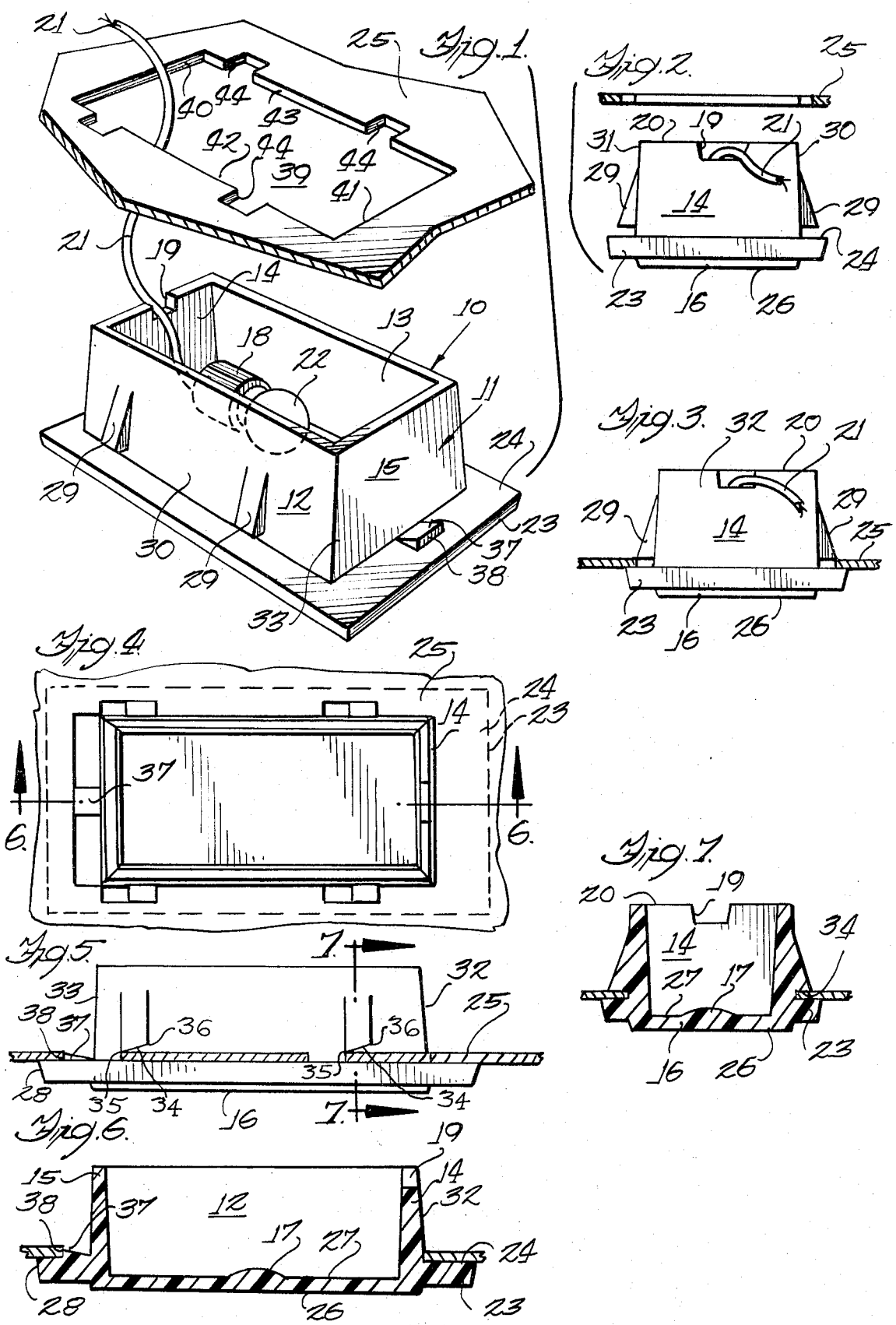

3,852,585

MOTOR VEHICLE LAMP UNIT

BACKGROUND OF THE INVENTION

Heretofore, motor vehicle lamp units of the general type to its present invention relates utilize for illuminating the interior of the vehicle body included a separate lens, light bulb socket means, and supporting structure for the lens and light bulb socket means. Additionally fastener means in the form of screw bolts or the like were required to secure the mounting or support means to a wall of the vehicle body.

SUMMARY OF THE INVENTION

In general, the primary objective of the present invention is to provide a novelly constructed vehicle lamp unit which is capable of being mounted either horizontally or vertically within the interior of the motor vehicle, the various components of the unit being readily formed as integral pieces of plastic material at a very low cost. The invention contemplates a lamp unit construction wherein the lens, lamp body, and means for securing the lamp body to the wall of the vehicle body are integrally formed of durable plastic material and, consequently, such lamp unit construction will have an exceedingly long and useful operating life.

Still another object of the invention is to provide an integrally formed housing and lens for a motor vehicle lamp unit which lamp unit can be manufactured economically and assembled readily on a mounting surface and has a minimum of parts requiring pre-assembly before the lamp can be mounted or assembled on the supporting surface.

A more specific object is to provide a translucent lens made of plastic material or the like which is integrally formed with a lamp housing coated with an opaque material. The invention further contemplates the provision of a plurality of lugs, integrally formed with the lamp housing, which are cooperative with the edge of the opening in the supporting wall on which the lamp unit is to be mounted so as to firmly secure the lamp to the supporting surface without the need of separate or individual fastening devices.

The foregoing and other important objects and desirable features inherent and encompassed by the invention, together with many of the purposes and uses thereof, will become readily apparent from a reading of the ensuing description in conjunction with the annexed drawings.

BRIEF DESCRIPTION OF THE DRAWINGS

FIG. 1 is an exploded, perspective view of the motor vehicle lamp unit embodying the invention and of a fragmentary portion of the interior or inner trim panel or headliner of a motor vehicle body prior to assembly of the lamp unit in an opening provided in the panel or headliner;

FIG. 2 is an end elevation view of the lamp unit, detached from the supporting inner trim panel, a fragmentary portion of which is shown in vertical section;

FIG. 3 is a view similar to FIG. 2, illustrating the lamp unit mounted on the supporting wall or panel;

FIG. 4 is a vertical plan view of the lamp unit embodying the invention with the lamp bulb and socket means therefor removed, the lamp unit is illustrated in its mounted or assembled position;

FIG. 5 is a side elevational view of the lamp unit shown in FIG. 4, illustrating the means for attaching it to a supporting wall or panel, a portion of such wall or panel being shown in vertical section;

FIG. 6 is a vertical sectional view taken substantially along line 6,6 of FIG. 4; and FIG. 7 is a vertical sectional view taken substantially along lines 7,7 of FIG. 5.

DESCRIPTION OF A PREFERRED EMBODIMENT OF THE INVENTION

Referring to the drawings in detail, wherein like reference characters represent like elements throughout the various views, a motor vehicle lamp unit embodying the invention is designated in its entirety by reference numeral 10. The lamp unit 10 includes a body member or housing 11 which is generally rectangular in shape, as evidenced by viewing FIG. 4. The housing 11 is preferably made of a resinous plastic material. The housing is partially defined by a pair of longitudinally extending, transversely spaced and generally parallel, side walls 12 and 13 and a pair of transversely extending, longitudinally spaced and generally parallel, end walls 14 and 15.

One end of the housing 11 (lowermost end as viewed in FIG. 7) is, in effect, closed by a translucent lens 16 which is integrally formed with the side and end walls of the housing 11 and, thus, made of resinous plastic material. The lens 16 may be formed and constructed as conventional similar separable lenses and provided with a substantially biconvex lens portion 17 (one face of which is, however, nearly flat) in the center as well as a Fresnel lens portion (not shown) encircling the lens portion 17.

A lamp bulb socket 18 is suitable mounted within the housing 11. One end wall 14 is provided with a notch 19 in its free edge 20 to accommodate electric wire means 21 utilized to energize a light bulb 22 adapted to be carried by the lamp socket 18.

Integrally formed with and extending outwardly from the side walls 12 and 13 and end walls 14 and 15 at the outer marginal edge area of the lens 16 is an outwardly extending support flange 23. The support flange 23, as evidenced by viewing FIG. 1, encircles the entire base of the housing 11 and, hence, the lens 16. The normally hidden or unexposed surface 24 of the encircling support flange 23 is generally flat. The support flange 23 serves as part of the means for securing or attaching the motor vehicle lamp unit 10 to a supporting wall surface, such as a motor vehicle body inner trim panel or headliner 25. Additionally, the support flange 23 serves as a decorative ring or the like encircling the exposed face 26 of the lens 16. The entire outer surface of the motor vehicle lamp unit 10, with the exception of the inner and outer faces 27, 26 respectively, of the lens 16, is preferably coated with an opaque material. Thus, only the lens 16, per se, remains translucent.

In addition to the support flange 23, the means for detachably mounting the motor vehicle lamp unit 10 on a supporting wall or the like includes two pairs of longitudinally spaced locking lugs 29, each pair of lugs 29 being disposed on a respective one of the outwardly facing wall surfaces 30, 31 of the side walls 12 and 13, respectively. It will be noted that the outwardly facing wall surfaces 30, 31 of the side walls 12, 13, respectively, and the outwardly facing wall surfaces 32 and 33 of the end walls 14 and 15, respectively, converge inwardly as they extend from the support flange surface 24. Each of the locking lugs 29 is substantially triangularly shaped when viewed in vertical transverse section, as shown in FIG. 7, and the clamping surface 34 defining the lowermost end thereof (as viewed in FIG. 7) is spaced from and inclined with respect to a plane containing the flat surface 24 of the support flange 23. Consequently, one transversely extending edge 35 of the lug clamping surface 34 is vertically spaced closer to the support flange flat surface 24 than the other transversely extending edge 36 of the lug clamping surface 34. The vertical spacing between the support flange flat surface 24 and the transversely extending edge 36 is preferably the same as or slightly larger than the thickness of the inner trim panel or headliner 25. The significance of this dimension will be appreciated hereinafter.

The means for detachably mounting the motor vehicle lamp unit 10 on a supporting wall also includes a single stop lug 37 which is integrally formed with the support flange 23. The stop lug 37 projects above the generally flat surface 24 of the flange 24 adjacent the end wall 15 and substantially midway between the side walls 12 and 13. The stop lug 37 is generally wedge shaped, as viewed in FIGS. 5 and 6 with the large end thereof defined by an abutment surface 38 disposed in a plane substantially normal to the plane containing the flat surface 24 of the support flange 23. It will also be noted that the abutment surface 38 is longitudinally spaced outwardly from the outwardly facing surface 33 of the end wall 15 and inwardly from the outer marginal edge 28 of the transverse section of the support flange 23 adjacent to such end wall 15.

The lamp unit 10 is adapted to be mounted within a generally rectangularly shaped opening 39 formed through the inner trim panel or headliner 25. The opening is partially defined by longitudinally spaced transversely extending edges 40, 41 and a pair of transversely spaced and parallel, longitudinal edges 42, 43. Each of the transversely extending edges 40, 41 has a length equal to or slightly larger than the transverse length of the juncture line between the flat surface 24 of the support flange 23 and either of the outer surfaces 32, 33 of the end walls 14 and 15 respectively. Thus when the lamp unit 10 is attached to the headliner 25 as will be pointed out hereinafter the longitudinal edges 42, 43 abut or lie closely adjacent to a respective one of the outer surfaces 30, 31 of the side walls 12, 13 respectively. The longitudinal spacing between the transversely extending edges 40, and 41 of the opening 39 is substantially equal to the longitudinal distance between the abutment surface 38 of the stop lug 37 and the juncture line between the outwardly facing surface 32 of the end wall 14 and the flat surface 24 of the support flange 23.

To assemble the lamp unit 10 on the headliner 25 the entire lamp unit 10 is simply advanced in a direction to cause the side walls 12, 13 and end walls 14 and 15 of the housing 11 to enter the opening 39 provided in the headliner 25 until the surface 24 of the support flange 23 abuts the surface of the headliner 25 encircling the opening 39. It is to be understood of course that during such movement of the lamp unit 10 with respect to the stationary headliner 25 each of the locking lugs 29 is aligned with and caused to pass through a respective one of four notches 44. As best shown in FIG. 1 two of the notches 44 are formed in the longitudinal edge 42 and the other two notches 44 are formed in the longitudinal edge 43 of the opening 39. After the aforementioned initial assembly movement of the lamp unit 10 with respect to the headliner 11, portions of the headliner 25 along each of the longitudinal edges 42, 43 of the panel opening 39 abut portions of the surface 24 of the support flange 23 disposed adjacent the outwardly facing surfaces 30, 31 of the side walls 12, 13 respectively. It will also be appreciated that inasmuch as the outwardly facing surfaces 30, 31, 32 and 33 are tapered, as pointed out hereinbefore, as are the locking lugs 29, as best shown in FIGS. 2, 3 and 7 insertion of the housing 11 into the opening 39 is facilitated. When the lamp unit 10 is in this position with the locking lugs 29 in alignment with the notches 44, the portion of the headliner 25 adjacent the transverse edge 41 bears against the stop lug 37 and the transverse edge 41 is adjacent to the outwardly facing surface 33 of the end wall 15 whereas the transverse edge 40 of the panel opening 39 is longitudinally spaced from the outwardly facing surface 32 of the end wall 14 a distance substantially equal to the longitudinal length of the stop lug 37. Thereafter, the entire lamp unit 10 is moved in a longitudinal direction to cause the outwardly facing surface 32 of the end wall 14 to approach transverse edge 40 of the headliner opening 39 until the edge portion of the headliner 25 along the transverse edge 41 clears the stop lug 37. Inasmuch as the headliner material is somewhat resilient and flexible, once the stop lug 37 clears the transverse edge 41 of the headliner opening 39 such edge portion assumes an undistorted or unflexed condition so as to dispose the abutment surface 38 of the stop lug 37 in abutting engagement with a mid-portion of the transverse edge 41, as shown in FIG. 5. During such longitudinal movement of the lamp unit with respect to the headliner 25 to effect final attachment of the lamp unit 10 to the headliner 25, a small portion of the headliner 25 adjacent a respective longitudinal side of each notch 44 is caused to be frictionally gripped by the clamping action provided by the inclined ramp or clamping surfaces 34 and the portions of the surface 24 in vertical alignment therewith. This later longitudinal sliding movement of the lamp unit 10 with respect to the headliner 25 effects a firm connection between the lamp unit 10 and the headliner 25 which cannot be loosened by the usual vibrations or shocks to which the vehicle body is subjected to during use. From the foregoing, it will be appreciated that transverse movement of the lamp unit 10 with respect to headliner 25 is effectively prevented by the panel opening longitudinal edges 42 and 43 cooperating with the outwardly facing wall surfaces 30, 31 respectively. Similarly, unwanted longitudinal displacement of the lamp unit 10 with respect to the headliner 25 is effectively prevented by the cooperation of the outwardly facing wall surface 32 and the transverse edge 40 of the headliner opening 39 and the abutment surface 38 of the stop lug 37 and the transverse edge 41 of the headliner opening 39. The clamping interaction of the ramp surfaces 34 of the locking lugs 29 and the support flange surface 24 on the headliner 25 results in the development of a frictional force sufficiently large to resist any disengagement of the lamp unit 10 from the headliner 25. It will also be appreciated that inasmuch as the locking lugs 29 are out of alignment with the notches 44 when the lamp unit 10 is in its assembled position on the headliner 25, the lamp unit 10 is effectively prevented from being inadvertently disengaged from the headliner 25 by shocks or by constantly acting vibratory forces such as occur on a vehicle in motion. However, should it be desired to detach the lamp unit 10 from the headliner 25, the edge portion of the headliner 25 along the transverse edge 41 is depressed sufficiently, by means of the blade of a screwdriver or the like being inserted between the headliner 25 and support flange surface 24 in the vicinity of the stop lug 37, to cause the transverse edge 41 to move out of abutting engagement with the abutment surface 38. Thereafter, the entire lamp 10 is capable of being slid longitudinally to disengage the ramp surfaces 34 from the portions of the headliner 25 adjacent the notches 44 and to simultaneously align the locking lugs 29 with the notches 44 so as to permit the lamp unit 10 to be bodily removed from the headliner opening 39.

The embodiment of the invention chosen for the purposes of illustration and description herein is that preferred for achieving the objects of the invention and developing the utility thereof in the most desirable manner, due regard being had to existing factors of economy, simplicity of design and construction, production methods, and the improvements sought to be effected. It will be appreciated therefore that the particular structural and functional aspects emphasized herein are not intended to exclude, but rather to suggest, such other adaptations and modifications of the invention as fall within the spirit and scope of the invention as defined in the appended claims.

What is claimed is:

1. A vehicle lamp unit supported upon an interior wall panel of a vehicle body, said wall panel having an opening formed therethrough, the combination including said wall panel, comprising, an open-ended lamp housing having means for supporting a lamp therein, the lamp housing being movable along a straight line substantially normal with respect to the wall panel to effect insertion of the lamp housing through said panel opening and placement of said lamp housing in a first position wherein a plurality of spaced, generally flat, outwardly facing wall surface portions of said lamp housing are disposed closely adjacent spaced respective edge portions of said wall panel partially defining said opening therethrough, said lamp housing being bodily movable with respect to said wall panel from said first position to a second position along a substantially straight line wherein one of said generally flat, outwardly facing wall surface portions of said lamp housing is moved away from and is spaced from the respective edge portion partially defining said panel opening that said one of said flat, outwardly facing wall surface portion was disposed closely adjacent to when said lamp housing was in its first position;

translucent lens means integrally formed with and closing one end of said lamp housing;

a support flange integrally formed with and extending radially outwardly from said lamp housing and said lens means adjacent the periphery of said lens means, said support flange being effective to abut said wall panel when said lamp housing is in its first and second positions, said support flange being effective to bridge the space formed between said one of said outwardly facing wall surface portion of said lamp housing and said last-mentioned respective edge portion partially defining said panel opening when said lamp housing is in its second position; and releasable securing means carried by the lamp housing and operably engageable with the wall panel when the lamp housing is in its second position to firmly connect the lamp housing to the wall panel, said releasable securing means being effective to operably engage the wall panel upon movement of said lamp housing from its first position to its second position.

2. The combination as set forth in claim 1, wherein said releasable securing means includes said support flange.

3. The combination as set forth in claim 2, wherein said wall panel opening is generally rectangular in shape and wherein said lamp housing is also generally rectangular in shape, and wherein said spaced, outwardly facing wall surface portions of said lamp housing disposed closely adjacent spaced, respective longitudinally extending edge portions of the panel opening when the lamp housing is in its first position includes a pair of transversely spaced, longitudinally extending and outwardly facing wall surface portions of said lamp housing disposed adjacent said support flange; and wherein bodily movement of the lamp housing with respect to said wall panel from its first position to its second position is along the longitudinal axis of the panel opening.

4. A vehicle lamp unit supported upon an interior wall panel of a vehicle body, said wall panel having a generally rectangularly shaped opening formed therethrough, the combination including said wall panel, comprising, a generally rectangularly shaped open-ended lamp housing having means for supporting a lamp therein, the lamp housing being movable along a straight line substantially normally with respect to the wall panel to effect insertion of said lamp housing through said panel opening and placement thereof in a first position, said lamp housing including a pair of transversely spaced, longitudinal side walls and a pair of longitudinally spaced, transverse end walls, said side and end walls being integrally formed, a first one of said transverse end walls being disposed closely adjacent a respective one of the transversely extending edge portions of the panel opening and the opposite transverse end wall being longitudinally spaced from the other one of the transversely extending edge portions of the panel opening when the lamp housing is in its first position, and outwardly facing wall surface portions of said side walls being disposed closely adjacent respective longitudinally extending edge portions of the panel opening when the lamp housing is in its first position, and the said first one of said transverse end walls being longitudinally spaced from the said respective one of the transversely extending edge portions of the panel opening and the said opposite transverse end wall being disposed closely adjacent the said other one of the transversely extending edge portions of the panel opening when the lamp housing is in a second position;

translucent lens means integrally formed with and closing one end of said lamp housing;

a support flange integrally formed with and extending outwardly from said lamp housing adjacent the periphery of said lens means, said support flange having a generally flat surface, said flat surface being in abutting engagement with said wall panel when said lamp housing is in its first and second positions; and releasable securing means carried by the lamp housing and operatively engageable with the wall panel when the lamp housing is in its second position to firmly connect the lamp housing to the wall panel, said releasable securing means being effective to operatively engage the wall panel upon bodily movement of the lamp housing with respect to said wall panel along the longitudinal axis of the panel opening from its first position to its second position, said releasable securing means including a plurality of longitudinally spaced locking lug means fixedly carried by each of said side walls, each of said locking lug means projecting outwardly from the outwardly facing wall surface of a respective lamp housing side wall and including a surface spaced from and overlying said support flange flat surface, said locking lug means surfaces and said support flange flat surface being cooperable only when said lamp housing is in its second position to frictionally grip respective wall panel portions at the longitudinal edges of said panel opening therebetween.

5. A vehicle lamp unit supported upon an interior wall panel of a vehicle body, said wall panel having a generally rectangularly shaped opening formed therethrough, the combination including said wall panel, comprising, a generally rectangularly shaped open-ended lamp housing having means for supporting a lamp therein, the lamp housing being movable in a first direction substantially normal with respect to the wall panel to effect insertion of the lamp housing through said panel opening and placement thereof in a first position, said lamp housing including a pair of transversely spaced, longitudinal side walls and a pair of longitudinally spaced, transverse end walls, said side and end walls being integrally formed and outwardly facing wall surface portions of said side walls being disposed closely adjacent respective longitudinally extending edges of the panel opening when the lamp housing is in its first position;

translucent lens means integrally formed with and closing one end of said lamp housing;

a support flange integrally formed with and extending outwardly from said lamp housing adjacent the periphery of said lens means, said support flange having a generally flat surface defining a plane said flat surface being effective to abut said wall panel and partially establish said first position of said lamp housing; and releasable securing means carried by the lamp housing and operatively engageable with the wall panel when the lamp housing is in a second position to firmly connect the lamp housing to the wall panel, said releasable securing means being effective to operatively engage the wall panel upon movement of the lamp housing from its first position to its second position in a second direction substantially perpendicular to said first direction of movement of said lamp housing, said releasable securing means including said support flange and a plurality of longitudinally spaced locking lug means fixedly carried by each of said side walls, each of said locking lug means projecting outwardly from the outwardly facing wall surface of a respective lamp housing side wall and including a surface spaced from and overlying said support flange flat surface, said locking lug means surfaces and said support flange flat surface being cooperable when said lamp housing is in its second position to frictionally grip respective wall panel portions at the longitudinal edges of the wall panel opening therebetween, each of said locking lug means including a locking lug integrally formed with and projecting transversely from a respective lamp housing longitudinal side wall, and each of said locking lug means surfaces is generally rectangular in shape and inclined with respect to the plane containing said support flange flat surface whereby one transverse edge of each of said locking lug means surfaces is spaced closer to said support flange flat surface when the other transverse edge thereof, said other transverse edge of each of said locking lug surfaces being spaced from said support flange flat surface a distance substantially equal to the thickness of said wall panel.

6. The combination as set forth in claim 5, wherein said releasable securing means further includes a single stop lug integrally formed with said support flange, said stop lug projecting from said support flange flat surface adjacent one of said lamp housing end walls, said stop lug being transversely spaced substantially midway between said lamp housing side walls and being provided with a transversely extending abutment surface disposed in a plane substantially normal to said plane containing said support flange flat surface, said abutment surface operatively engaging a respective transverse edge of said panel opening when said lamp housing is in its second position.

7. The combination as set forth in claim 6, wherein each of the longitudinal edges of said panel opening is provided with notches therein, each of said locking lugs being alignable with a respective notch to permit movement of said lamp housing in said first direction to its first position, said locking lugs moving out of alignment with said notches as said lamp housing is moved in said second direction to its second position.

8. The combination as set forth in claim 7, wherein the length of said panel opening measured longitudinally between the transversely extending edges of said panel opening is substantially equal to the longitudinal distance between said abutment surface of said stop lug and the juncture of the outwardly facing wall surface of the lamp housing end wall opposite said one of said lamp housing end walls having said stop lug adjacent thereto and said support flange flat surface whereby one of said panel opening transverse edges abuts said abutment surface and the other panel opening transverse edge abuts the outwardly facing wall surface of a respective lamp housing end wall adjacent the juncture thereof with said support flange flat surface when said lamp housing is in its second position.

9. The combination as set forth in claim 8, wherein said lamp housing, support flange, lens means, locking lugs, and stop lug are formed as a unitary structure from resinous plastic material, and said lamp housing and said support flange are opaque.

* * * * *